(12) United States Patent
Bergelin et al.

(10) Patent No.: US 8,849,453 B2
(45) Date of Patent: Sep. 30, 2014

(54) HUMAN GRASP ASSIST DEVICE WITH EXOSKELETON

(75) Inventors: Bryan J Bergelin, Houston, TX (US); Chris A. Ihrke, Hartland, MI (US); Donald R. Davis, Novi, MI (US); Douglas Martin Linn, White Lake, MI (US); Lyndon B. J. Bridgwater, Friendswood, TX (US)

(73) Assignees: GM Global Technology Operations LLC, Detroit, MI (US); The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 346 days.

(21) Appl. No.: 13/408,656

(22) Filed: Feb. 29, 2012

(65) Prior Publication Data
US 2013/0219585 A1 Aug. 29, 2013

(51) Int. Cl.
*G07F 19/00* (2006.01)
*A61B 5/103* (2006.01)

(52) U.S. Cl.
USPC ........... 700/250; 700/213; 700/258; 700/259; 700/260; 700/261; 600/595

(58) Field of Classification Search
None
See application file for complete search history.

(56) References Cited

U.S. PATENT DOCUMENTS

| | | | |
|---|---|---|---|
| 5,117,700 A | 6/1992 | Trechsel | |
| 5,845,540 A | 12/1998 | Rosheim | |
| 5,912,658 A * | 6/1999 | Bergamasco et al. | 345/156 |
| 5,967,580 A | 10/1999 | Rosheim | |
| 6,413,229 B1 * | 7/2002 | Kramer et al. | 600/595 |
| 6,658,962 B1 | 12/2003 | Rosheim | |
| 7,784,363 B2 | 8/2010 | Ihrke et al. | |
| 8,029,414 B2 | 10/2011 | Ingvast et al. | |
| 8,056,423 B2 | 11/2011 | Abdallah et al. | |
| 2003/0150136 A1 | 8/2003 | Johnson | |
| 2010/0152898 A1 | 6/2010 | Reiland et al. | |
| 2010/0280659 A1 | 11/2010 | Abdallah et al. | |
| 2010/0280662 A1 | 11/2010 | Abdallah et al. | |
| 2011/0071664 A1 * | 3/2011 | Linn et al. | 700/213 |
| 2011/0071678 A1 | 3/2011 | Ihrke et al. | |

FOREIGN PATENT DOCUMENTS

| | | | |
|---|---|---|---|
| JP | 11253504 A | 9/1999 | |
| JP | 2002320632 A | 11/2002 | |
| JP | 2010050226 A | 3/2010 | |

* cited by examiner

*Primary Examiner* — Yolanda Cumbess
(74) *Attorney, Agent, or Firm* — Quinn Law Group, PLLC

(57) ABSTRACT

A grasp assist system includes a glove, actuator assembly, and controller. The glove includes a digit, i.e., a finger or thumb, and a force sensor. The sensor measures a grasping force applied to an object by an operator wearing the glove. Phalange rings are positioned with respect to the digit. A flexible tendon is connected at one end to one of the rings and is routed through the remaining rings. An exoskeleton positioned with respect to the digit includes hinged interconnecting members each connected to a corresponding ring, and/or a single piece of slotted material. The actuator assembly is connected to another end of the tendon. The controller calculates a tensile force in response to the measured grasping force, and commands the tensile force from the actuator assembly to thereby pull on the tendon. The exoskeleton offloads some of the tensile force from the operator's finger to the glove.

16 Claims, 2 Drawing Sheets

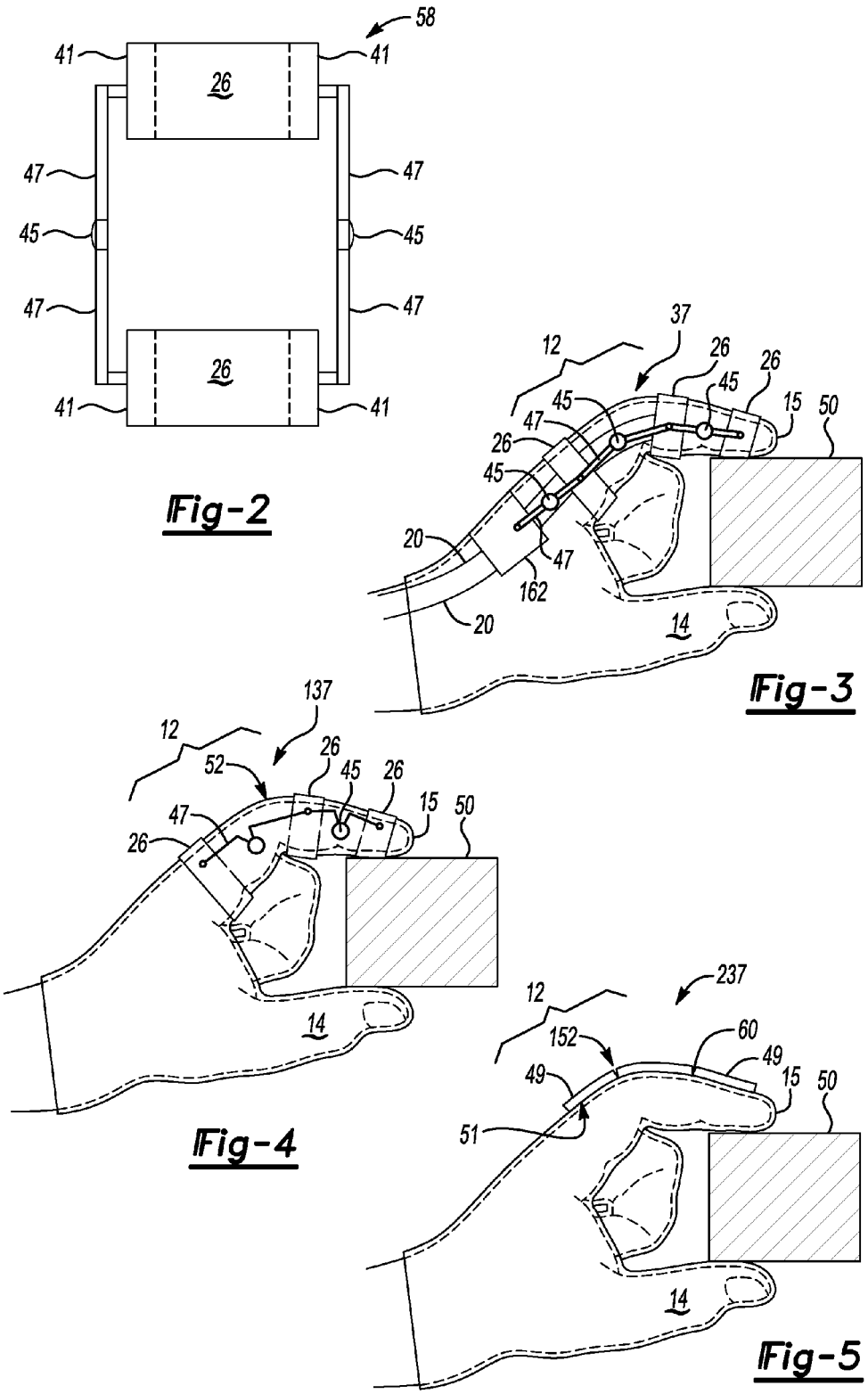

US 8,849,453 B2

HUMAN GRASP ASSIST DEVICE WITH EXOSKELETON

This invention was made with government support under NASA Space Act Agreement number SAA-AT-07-003. The invention described herein may be manufactured and used by or for the U.S. Government for U.S. Government (i.e., non-commercial) purposes without the payment of royalties thereon or therefor.

TECHNICAL FIELD

The present disclosure relates to a human grasp assist device having an exoskeleton.

BACKGROUND

Ergonomics is an evolving scientific discipline that ultimately seeks to understand and improve human interactions with the various pieces of equipment used within a work environment, e.g., keyboards, workstations, torque wrenches, control input devices, and the like. Good ergonomic design practices seek to optimize aspects of the physical work environment as they relate to the human operators working therein. However, certain work tasks may stress an operator in a manner that cannot be lessened by even the most optimal of ergonomic workplace configurations.

For example, manual operations requiring a repetitive or sustained grasping of an object can stress an operator's hands, fingers, and forearms. As a result, an operator's grasp strength and productivity can gradually decline over the course of a work day. Grasp strength can also vary widely between different operators due to differences in physical stature, injury, and/or muscle fatigue. The variable nature of a given operator's grasp strength may result in relatively inefficient execution of certain grasp-related work tasks. Conventional devices such as wrist straps and braces exist for easing some of the stress on an operator, although such devices may remain less than optimal for improving overall grasp strength.

SUMMARY

A grasp assist device is disclosed herein that a human operator may use for increased grasp strength. The present device includes a glove that is worn on the operator's hand and a sleeve that is worn on the operator's forearm. An exoskeleton is used with the digits of the glove, i.e., the fingers and/or thumb, to offload forces from the operator's corresponding fingers or thumb to structural support elements of the glove, as well as to safely limit the range of motion of the operator's fingers, thus preventing hyperextension.

In addition to the exoskeleton, the present grasp assist device may include multiple flexible tendons. The tendons are selectively tensioned with a calculated tensile force by a corresponding actuator assembly. The actuator assembly pulls as needed on the tendon(s) via phalange rings connected to the exoskeleton to help close the operator's hand into a desired grasp pose. In another embodiment, the tendons may be routed on the back of the glove so as to help release the grasp. Force sensors positioned with respect to the glove provide force feedback signals to a controller that is contained in the sleeve. The controller commands the calculated tensile force from the actuator assemblies to place the tendons under tension.

In particular, a grasp assist system includes a glove, an actuator assembly, and a controller. The glove includes a force sensor, phalange rings, a tendon, and an exoskeleton. The force sensor measures a grasping force applied to an object by an operator wearing the glove. The phalange rings are positioned with respect to a digit of the glove, i.e., a finger or a thumb. The tendon is connected at one end to one of the phalange rings and routed through the remaining phalange rings of that digit.

The exoskeleton is positioned with respect to the digit. Hinged interconnecting members are connected to adjacent phalange rings. The actuator assembly is connected to another end of the tendon. The controller, which is in communication with the force sensor, calculates a tensile force in response to the measured grasping force, and also commands the calculated tensile force from the actuator assembly to thereby pull on the tendon and move the digit. The exoskeleton offloads some of the tensile force from the operator's finger to structural support elements of the glove.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a schematic illustration of an example hinged exoskeleton and adjacent phalange rings usable with the grasp assist device shown in FIG. 1.

FIG. 3 is a schematic illustration of a hinged exoskeleton according to one possible embodiment.

FIG. 4 is a schematic illustration of another hinged exoskeleton according to an alternative embodiment.

FIG. 5 is a schematic illustration of an alternative segmented exoskeleton.

DETAILED DESCRIPTION

Figure 1:
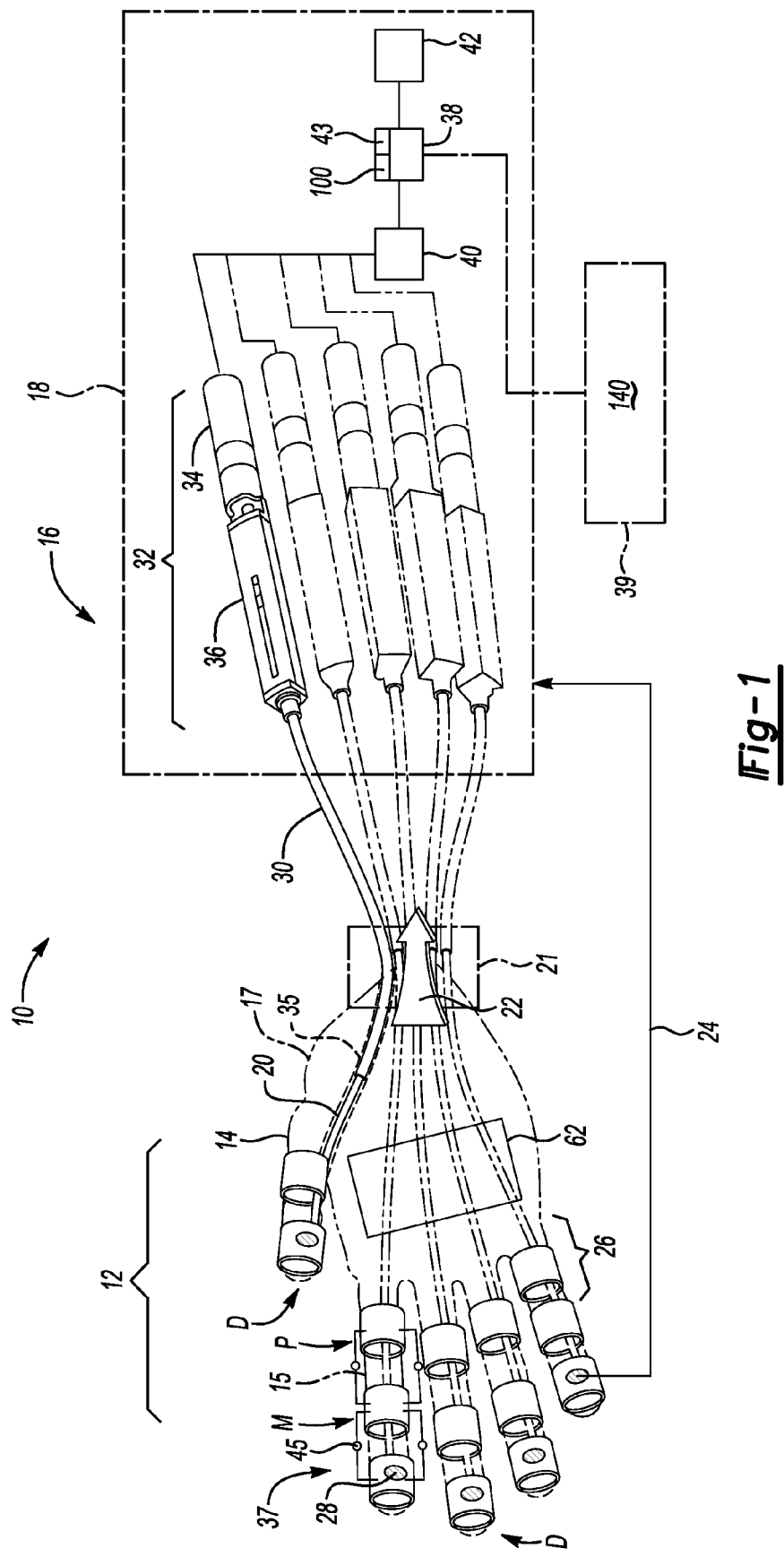
FIG. 1 is a schematic illustration of an example grasp assist device having a glove with an exoskeleton, a flexible sleeve, and a controller.

With reference to the drawings, wherein like reference numbers refer to the same or similar components throughout the several views, an example grasp assist device 10 is shown in FIG. 1. The device 10 includes a glove 12 and a flexible sleeve 18. The glove 12 also includes an exoskeleton 37 positioned with respect to at least one digit of the glove 12, i.e., a finger 15 or a thumb 14. When worn by an operator, the device 10 assists the operator in grasping an object while the exoskeleton(s) 37 offloads some of the forces from the operator's finger(s) or thumb to a sufficiently rigid structural support element of the glove 12, for instance a conduit anchor 62 as described below or an anchor 162 as shown schematically in FIG. 3. Example embodiments of the exoskeleton 37 are described in further detail below with reference to FIGS. 2-5.

The grasp assist device 10 shown in FIG. 1 may include a set of actuators, for instance a motor-driven tendon drive system (TDS) 16 in one possible embodiment. The TDS 16 may be fully enclosed or contained at least partially within the sleeve 18. The TDS 16 may be linked to the glove 12 via one or more flexible tendons 20 contained at least partially within a conduit 30.

In one embodiment, each of the tendons 20 may be configured as a braided polymer, which in turn may include a suitable fluorocarbon that increases the wear life of each tendon. However, other flexible and sufficiently sturdy materials may also be used without departing from the intended scope of the invention. An augmenting tensile force (arrow 22) is calculated by a controller 38, and may be applied to some or all of the tendons 20 via the TDS 16 in response to feedback signals (arrow 24) received by the controller 38 from one or more force sensors 28.

The glove 12 of FIG. 1 may include a thumb 14 and one or more fingers 15, e.g., a full four-finger/one thumb glove as shown, or the glove 12 may use fewer fingers 15 and/or no thumb 14 in other embodiments. An operator may wear the glove 12 in the manner of a conventional glove. Phalange rings 26 are connected to material 17 of the glove 12 or worn on the outside of the fingers 15 and/or thumb 14. The phalange rings 26 may be rigid, e.g., aluminum or plastic, with the exoskeleton 37 spanning the distance between adjacent phalange rings 26 on the same digit as shown. In such an embodiment, the exoskeleton 37 may be welded, riveted, or otherwise fastened to the phalange rings 37, bending or rotating as needed via a hinge 45.

When the glove 12 of FIG. 1 is worn on an operator's hand, each of the phalange rings 26 may circumscribe a thumb 14 or a finger 15 of the glove 12, and thus the operator's own thumb and fingers, or the phalange rings 26 may be positioned within the material 17 defining the thumb 14/fingers 15 depending on the embodiment. Thus, any tensile force (arrow 22) applied to some or all of the tendons 20 routed through the various phalange rings 26 of the glove 12 can act on the phalange rings 26 and the connecting exoskeleton 37, thus offloading some of the forces from the operator's fingers/thumb within the glove 12.

In general, a threshold grasping force exerted by an operator on an object held in the operator's grasp activates any of the force sensor(s) 28 that are in direct contact with the object. The force sensors 28 may be positioned anywhere on the glove, for example on one or more of the fingers 15 and thumb 14 as shown, on a palm of the glove, etc. The phalange rings 26 are connected to or in contact with the tendons 20 that run through the phalange rings 26, with at least some of the phalange rings 26 thus acting as guides for the tendons 20.

The phalange rings 26 of FIG. 1 may be distal (arrow D), i.e., positioned at the distal phalange of a finger 15 or thumb 14, medial (arrow M), i.e., positioned at the medial phalange of the finger 15 or thumb 14, or proximal (arrow P, i.e., positioned at the proximal phalange of the finger 15 or thumb 14. Each of the tendons 20 terminates at a particular phalange ring 26, such as at the distal (arrow D) phalange rings 26 as shown in FIG. 1, or alternatively at a medial (arrow M) phalange ring 26.

The example TDS 16 shown in FIG. 1 may be connected to one end of a corresponding one of the tendons 20. Each tendon 20 is disposed and freely moveable within a corresponding conduit 30. The conduit 30 may be substantially rigid in the compressive direction and flexible in other directions, e.g., a stainless steel coil. A conduit anchor 62 such as a piece of hard plastic may be securely fastened to the glove 12 and used to prevent motion of the conduits 30 toward the fingers 15 when under tension. For example, the conduit anchor 62 may define circular channels (not shown) in which the conduits 30 are received, with the tendon 20 extending from the conduit anchor 62 toward the fingers 15.

The tendons 20 of FIG. 1 may pass through an optional tendon concentrator 21 as shown schematically in FIG. 1. The tendon concentrator 21 may be located on or near the base of the palm or a wrist area of the operator. As shown in phantom, multiple actuator assemblies 32, for instance motorized ball screw devices or linear actuators to which the tendons 20 are attached, may be configured in an array within the TDS 16. Each actuator assembly 32 acts on a corresponding tendon 20. When only one TDS 16 is used, the tendon concentrator 21 may be used to connect the tendons 20 leading from a thumb 14 and each finger 15 to a single actuator tendon, i.e., the tendon 20 shown via solid lines in FIG. 1. The tendon concentrator 21 in this instance provides an area for the multiple tendons 20 to be connected to a single tendon 20.

Still referring to FIG. 1, each actuator assembly 32 of the TDS 16 according to a particular embodiment may include a corresponding servo motor 34 and a corresponding drive assembly 36, for example a ball and screw-type device according to one embodiment. Other embodiments are possible such as linear actuators, motorized spools, etc. Operational control of the TDS 16 is provided via the controller 38.

The controller 28 may draw any required power from an energy supply 40. The energy supply 40 may be part of the sleeve 18, or it may be a larger unit, represented in FIG. 1 as an energy supply 140, that is worn external to the sleeve 12, such as on an optional belt pack 39 as shown in phantom. The energy supply 40 may be configured as a battery pack, for instance a lithium ion cell or cells, or any other relatively lightweight or low-mass energy storage device.

A user interface 42 may be connected to the sleeve 18 in communication with the controller 38, or the user interface 42 may be an integral part of the controller 38. The user interface 42 may be used to facilitate selection of a desired operating mode, and therefore may be configured as an operator-accessible control panel, a touchpad, or a touch screen allowing an operator to interface with the controller 38. The controller 38 of FIG. 1 processes the set of force feedback signals (arrow 24). Computer-executable code 100 may be recorded on tangible, non-transitory memory 43 of the controller 38 and executed thereby to calculate and select an optimal augmenting tensile force (arrow 22) in response to the values relayed via the feedback signals (arrow 24) and the user-selected operating mode, as well as to provide other control actions as set forth below with reference to FIG. 3. This augmenting tensile force (arrow 22) is then applied to some or all of the tendons 20 using the drive assembly 36 to assist the grasp of an operator wearing the grasp assist device 10.

The controller 38 of FIG. 1 may include one or more integrated circuits, which may be augmented by various electronic devices such as voltage regulators, capacitors, drivers, timing crystals, communication ports, etc. The controller 38 may be a microcontroller in one embodiment using limited power and the memory 43, e.g., read only memory (ROM), random access memory (RAM), and/or electrically-programmable read only memory (EPROM), and any required input/output (I/O) circuit devices, as well as signal conditioning and buffer electronics. A processor is used to provide the required processing power. Individual control algorithms resident in the controller 38 or readily accessible thereby may be stored in, e.g., ROM, and automatically executed at one or more different control levels to provide the respective control functionality.

Referring to FIG. 2, an example exoskeleton assembly 58 includes a pair of adjacent phalange rings 26 and the exoskeleton 37 also shown in FIG. 1. The exoskeleton 37 may include rigid interconnecting members 47, for instance metal or plastic bars, each of which being welded, riveted, or otherwise fastened to an outer surface 41 of the phalange rings 26. The interconnecting members 47 on a common side of the phalange rings 26 may be joined via a corresponding hinge 45 such that the interconnecting members 47 are allowed to freely rotate with respect to the hinge 45 when an operator wearing the glove 12 bends a digit, e.g., a finger 15, of the glove 12.

The hinges 45 may flank the operator's finger joints. Each tendon 20 of FIG. 1 may be connected to a corresponding one of the phalange rings 26 and routed through another phalange ring 26, e.g., the medial (arrow M) or proximal (arrow P) rings 26, back to the palm of the glove 12, for instance to the anchor 162 of FIG. 3, and/or to a conduit anchor 62. The conduit anchor 62 of FIG. 1 may be positioned to receive the conduit (s) 30 shown in the same Figure, and may be securely attached to the glove 12 to prevent undesired axial motion of the conduit(s) 30. When used for grasp release assistance, the conduit anchor 62 and tendons 20 would be positioned on the back of the glove 12 as would be understood in the art. Use of the exoskeleton 37 of FIG. 2 in this manner can help to offload some of the tensile force (arrow 22 of FIG. 1) that would otherwise act directly on the operator's fingers/thumb absent the use of the exoskeleton assembly 58.

Referring to FIG. 3, an operator's hand is shown wearing the glove 12 and grasping an example object 50. In one embodiment, multiple exoskeletons 37 may be connected between three adjacent phalange rings 26 on a digit, e.g., a finger 15 or thumb 14, of the glove 12. Another interconnecting member 47 may extend from the proximal phalange to the anchor 162 to offload force from the digit(s) to the anchor 162, or to another suitable load bearing structure of the glove 12. In such an embodiment, another hinge 45 or other suitable structure such as a slot and pin may be used to connect the interconnecting member 47 to the anchor 162.

Optionally, by actuating tendons 20 routed to both the flexor and extensor sides of a digit simultaneously, as shown schematically in FIG. 3, the grasp assist device 10 may serve to make the digit stiff or rigid. While omitted for illustrative clarity, the tendons 20 each extend toward a corresponding actuator assembly 32 (see FIG. 1) as explained above. Such an approach may be useful for tasks that involve pushing an object with the tip of a finger 15, e.g., a push-button operation. That is, multiple tendons 20 may be connected to a single one of the fingers 15 to stiffen the finger 15 when the multiple tendons 20 are actuated by the actuator assemblies 32.

Referring to FIG. 4, the exoskeleton 37 of FIG. 2 may be alternatively embodied as an exoskeleton 137 having range-limiting features 52. The tendons 20 of FIG. 3 are omitted for clarity, but are present and extend toward the actuator assemblies 32 as shown in FIG. 1. Rather than a straight connection between interconnecting members 47 and the hinge 45, adjacent interconnecting members 47 may instead form a V-shaped profile. Thus, when the operator straightens a finger, each range-limiting feature 52 closes upon itself to prevent hyperextension of the operator's finger. Such an embodiment may be particularly useful, for example, in certain maneuvers where an operator must hold a finger relatively stiff and repeatedly press a button.

Referring to FIG. 5, in an alternative or complementary embodiment another exoskeleton 237 may be used to passively restrain an operator's finger. The exoskeleton 237 may be sewn inside of the material of the finger 15 or a thumb 14 of the glove 12 and used to limit motion/prevent hyperextension of the operator's finger or thumb. Unlike the embodiments of FIGS. 2-4, the embodiment of FIG. 5 is not tendon-actuated, but may be used in conjunction with the exoskeleton's 37 and 137 described above for added benefit.

As with the embodiment of FIG. 4, the exoskeleton 237 of FIG. 5 may include range-limiting features 152 which close on themselves to prevent hyperextension of the operator's finger. In a particular embodiment, the range-limiting features 152 of the exoskeleton 237 may be constructed by partially scoring a single sheet of material, e.g., laminated plastic, to form slots 60 between adjacent segments 49. When laminated plastic is used, a surface 51 may remain that is flexible and not scored. Other approaches may be used to form the exoskeleton 237.

The slots 60 of the exoskeleton 237 provide another range-limiting feature. Interference between adjacent segments 49 when the finger 15 of the glove 12 is fully straightened can thus prevent hyperextension of the operator's finger. The materials and thickness of the exoskeleton as well as the depth/width/cross section of the slots 60 may be configured to provide the required level of resistance to hyperextension.

While the best modes for carrying out the invention have been described in detail, those familiar with the art to which this invention relates will recognize various alternative designs and embodiments for practicing the invention within the scope of the appended claims.

The invention claimed is:

1. A grasp assist system comprising:
    a glove having:
        a digit, wherein the digit is one of a finger and a thumb;
        a force sensor positioned with respect to the glove and configured to measure a grasping force applied to an object by an operator wearing the glove;
        a plurality of phalange rings positioned with respect to the digit;
        a flexible tendon connected at one end to one of the phalange rings and routed through the remaining phalange rings;
        an exoskeleton connected to the phalange rings, wherein the exoskeleton includes a plurality of hinged interconnecting members each connected to a corresponding one of the phalange rings; and
        an additional exoskeleton defined by a single piece of slotted material, wherein the slotted material defines slots, and each of the slots defines adjacent segments of the additional exoskeleton;
    an actuator assembly connected to another end of the tendon; and
    a controller in communication with the force sensor, wherein the controller is configured to calculate a tensile force in response to the measured grasping force, and to command the tensile force from the actuator assembly to pull on the tendon and thereby move the digit;
    wherein the exoskeleton and the additional exoskeleton offloads some of the tensile force from the operator's finger to the glove.

2. The system of claim 1, wherein the exoskeleton includes a range-limiting feature which prevents hyperextension of the operator's finger.

3. The system of claim 1, wherein the range-limiting feature is a V-shaped profile defined by adjacent interconnecting members in proximity to the hinge.

4. The system of claim 1, wherein the additional exoskeleton is constructed of scored and laminated plastic.

5. The system of claim 1, further comprising an anchor positioned with respect to the glove, wherein the exoskeleton extends between the anchor and one of the phalange rings that is proximal with respect to a palm of the glove.

6. A grasp assist system comprising:
    a glove having:
        a plurality of fingers and a thumb;
        a force sensor positioned with respect to the glove and configured to measure a grasping force applied to an object by an operator wearing the glove;
        a plurality of phalange rings positioned with respect to the fingers, wherein each finger includes at least two phalange rings; and
        a plurality of flexible tendons each connected at one end to a corresponding one of the phalange rings for a given one of the fingers, and each routed through the remaining phalange rings for that finger;

a plurality of exoskeletons, wherein each exoskeleton is connected to each of the phalange rings on a corresponding one of the fingers, and includes a plurality of hinged interconnecting members;

an additional exoskeleton that includes a single piece of slotted material, wherein the slotted material defines a plurality of slots, and each slot of the slotted material defines adjacent segments of the additional exoskeleton;

a plurality of actuator assemblies each connected to another end of a corresponding one of the tendons; and a controller in communication with the force sensor, wherein the controller is configured to calculate a tensile force in response to the measured grasping force, and to command the tensile force from the actuator assemblies to pull on the tendons and thereby move the fingers;

wherein the exoskeleton offloads some of the tensile force from the operator's fingers to the glove.

7. The system of claim 6, wherein the range-limiting feature is a V-shaped profile defined by adjacent interconnecting members in proximity to the hinge.

8. The system of claim 6, wherein the additional exoskeleton is constructed of scored and laminated plastic.

9. The system of claim 6, further comprising an anchor positioned with respect to the glove, wherein at least one of the exoskeletons extends between the anchor and one of the phalange rings that is proximal with respect to a palm of the glove.

10. The system of claim 6, wherein the force sensor is positioned with respect to the thumb.

11. The system of claim 6, wherein multiple tendons of the plurality of flexible tendons are connected to a single one of the fingers to thereby stiffen the finger when each of the multiple tendons is actuated by a corresponding one of the actuator assemblies.

12. A grasp assist system comprising:

a glove having:
 a digit, wherein the digit is one of a finger and a thumb;
 a force sensor positioned with respect to the glove and configured to measure a grasping force applied to an object by an operator wearing the glove;
 a plurality of phalange rings positioned with respect to the digit;
 a flexible tendon connected at one end to one of the phalange rings and routed through the remaining phalange rings;
 an exoskeleton positioned with respect to the digit, wherein the exoskeleton is a single piece of slotted material, wherein the slots of the slotted material define adjacent segments which provide a range-limiting feature to the digit that prevents hyperextension of an operator's finger positioned within the digit; and
 an additional exoskeleton connected to the phalange rings, wherein the additional exoskeleton includes a plurality of hinged interconnecting members each connected to a corresponding one of the phalange rings to thereby offload some of the tensile force from the operator's finger to the glove;

an actuator assembly that is connected to another end of the tendon; and a controller in communication with the force sensor, wherein the controller is configured to calculate a tensile force in response to the measured grasping force, and to command the tensile force from the actuator assembly to pull on the tendon and thereby move the digit.

13. The system of claim 12, wherein the exoskeleton is constructed of scored and laminated plastic.

14. The system of claim 12, wherein the plurality of phalange rings includes two phalange rings on each of four digits of the glove, and wherein each of the hinged interconnecting members is connected to the two phalange rings on a corresponding one of the four digits.

15. The system of claim 12, wherein the additional exoskeleton includes a range-limiting feature having a V-shaped profile defined by adjacent interconnecting members in proximity to the hinge between the adjacent interconnecting members.

16. The system of claim 12, wherein the tendon includes a plurality of tendons each connected to the digit to thereby stiffen the digit when the tendon is placed under tension by the actuator assembly.

* * * * *